US010435329B2

(12) United States Patent
Allais et al.

(10) Patent No.: US 10,435,329 B2
(45) Date of Patent: Oct. 8, 2019

(54) SIZING COMPOSITION FOR MINERAL WOOL, COMPRISING LIGNOSULFONATE AND A CARBONYL COMPOUND, AND RESULTING INSULATING PRODUCTS

(71) Applicants: SAINT-GOBAIN ISOVER, Courbevoie (FR); INSTITUT NATIONAL DE LA RECHERCHE AGRONOMIQUE, Paris (FR)

(72) Inventors: Florent Allais, Reims (FR); Paul-Henri Ducrot, Igny (FR); Orianne Broussard, Orsay (FR); Morgane Petit, Paris (FR); Christelle Silioc, Bourg la Reine (FR)

(73) Assignees: SAINT-GOBAIN ISOVER, Courbevoie (FR); INSTITUT NATIONAL DE LA RECHERCHE AGRONOMIQUE, Paris (FR)

( * ) Notice: Subject to any disclaimer, the term of this patent is extended or adjusted under 35 U.S.C. 154(b) by 0 days.

(21) Appl. No.: 15/547,178

(22) PCT Filed: Feb. 1, 2016

(86) PCT No.: PCT/FR2016/050205
§ 371 (c)(1),
(2) Date: Jul. 28, 2017

(87) PCT Pub. No.: WO2016/120576
PCT Pub. Date: Aug. 4, 2016

(65) Prior Publication Data
US 2018/0009708 A1    Jan. 11, 2018

(30) Foreign Application Priority Data
Jan. 30, 2015   (FR) ...................................... 15 50721
Jan. 30, 2015   (FR) ...................................... 15 50723

(51) Int. Cl.
C03C 25/34         (2006.01)
C08L 97/00         (2006.01)
G10K 11/162        (2006.01)

(52) U.S. Cl.
CPC ............ C03C 25/34 (2013.01); C08L 97/005 (2013.01); G10K 11/162 (2013.01)

(58) Field of Classification Search
CPC ..... C03C 25/34; C08L 97/005; C08J 197/005
See application file for complete search history.

(56) References Cited

U.S. PATENT DOCUMENTS

| | | | | |
|---|---|---|---|---|
| 3,296,159 A * | 1/1967 | Lissner | ............ | C08G 16/0293 524/594 |
| 3,886,101 A * | 5/1975 | Felicetta | ................ | C08H 6/00 156/335 |
| 4,105,606 A * | 8/1978 | Forss | ................... | C08L 97/02 524/73 |
| 4,127,544 A * | 11/1978 | Allan | ................... | C08G 8/18 156/335 |
| 4,130,515 A * | 12/1978 | Bornstein | .......... | C08G 16/0293 156/307.3 |
| 4,177,313 A * | 12/1979 | Herault | ................ | C04B 26/122 156/296 |
| 4,546,173 A * | 10/1985 | Dilling | .................. | C08L 97/005 530/501 |
| 4,886,854 A * | 12/1989 | Markessini | ........... | C08G 12/02 524/14 |
| 5,075,402 A * | 12/1991 | Schmitt | ................ | C08L 97/005 524/56 |
| 5,290,843 A * | 3/1994 | McDonald | ............... | C08G 8/28 428/117 |
| 5,318,990 A | 6/1994 | Strauss | | |
| 5,340,868 A | 8/1994 | Strauss et al. | | |
| 5,656,733 A * | 8/1997 | Suchanec | ................. | C07G 1/00 524/72 |
| 5,661,213 A | 8/1997 | Arkens et al. | | |
| 5,895,804 A | 4/1999 | Lee et al. | | |
| 5,932,689 A | 8/1999 | Arkens et al. | | |
| 5,977,232 A | 11/1999 | Arkens et al. | | |
| 6,071,994 A | 6/2000 | Hummerich et al. | | |
| 6,099,773 A | 8/2000 | Reck et al. | | |
| 6,146,746 A | 11/2000 | Reck et al. | | |
| 6,291,558 B1 * | 9/2001 | Raskin | ..................... | C07G 1/00 524/13 |

(Continued)

FOREIGN PATENT DOCUMENTS

CN        104004479 A      8/2014
WO    WO 2007/014236 A2   2/2007

(Continued)

OTHER PUBLICATIONS

International Search Report as issued in International Patent Application No. PCT/FR2016/050205, dated May 9, 2016.

*Primary Examiner* — Liam J Heincer
(74) *Attorney, Agent, or Firm* — Pillsbury Winthrop Shaw Pittman LLP

(57) ABSTRACT

A sizing composition for insulating products based on mineral wool, in particular glass or rock wool, which includes at least one ammonium lignosulfonate or alkali metal or alkaline earth metal salt of lignosulfonic acid, and at least one carbonyl compound of formula:

$$R\text{---}[C(O)R_1]_x \qquad (I)$$

in which: R represents a saturated or unsaturated and linear, branched or cyclic hydrocarbon radical, a radical including one or more aromatic nuclei which consist of 5 or 6 carbon atoms, a radical including one or more aromatic heterocycles containing 4 or 5 carbon atoms and an oxygen, nitrogen or sulfur atom, it being possible for the R radical to contain other functional groups, in particular hydroxyl or alkoxy groups, especially methoxy groups, $R_1$ represents a hydrogen atom or a $C_1$-$C_{10}$ alkyl radical, and x varies from 1 to 10.

12 Claims, No Drawings

(56) References Cited

U.S. PATENT DOCUMENTS

| | | | |
|---|---|---|---|
| 6,299,936 B1 | 10/2001 | Reck et al. | |
| 6,331,350 B1 | 12/2001 | Taylor et al. | |
| 2001/0009945 A1* | 7/2001 | Delaviz | C03C 25/34 524/594 |
| 2002/0091185 A1 | 7/2002 | Taylor et al. | |
| 2003/0008978 A1 | 1/2003 | Chen et al. | |
| 2003/0045665 A1* | 3/2003 | Sudan | C08G 8/10 527/300 |
| 2005/0215153 A1 | 9/2005 | Cossement et al. | |
| 2011/0101260 A1* | 5/2011 | Pons Y Moll | C03C 25/26 252/8.83 |
| 2011/0124847 A1* | 5/2011 | Chen | C04B 24/18 530/501 |
| 2011/0210280 A1* | 9/2011 | Jaffrennou | C03C 25/26 252/62 |
| 2013/0233037 A1* | 9/2013 | Adam | C05G 3/06 71/23 |
| 2014/0113123 A1* | 4/2014 | Chuda | C08L 31/04 428/219 |
| 2014/0127491 A1* | 5/2014 | Varagnat | C03C 25/321 428/219 |
| 2015/0159061 A1* | 6/2015 | Kouisni | C09J 161/06 524/841 |
| 2015/0210904 A1* | 7/2015 | Cothran | C08L 61/06 428/526 |
| 2015/0259534 A1* | 9/2015 | Dowden | C08L 97/005 524/541 |
| 2016/0096985 A1* | 4/2016 | Knight | C09J 161/12 428/355 CP |
| 2018/0009708 A1* | 1/2018 | Allais | G10K 11/162 |

FOREIGN PATENT DOCUMENTS

| | | | | |
|---|---|---|---|---|
| WO | WO 2009/019232 A1 | 2/2009 | | |
| WO | WO 2009/019235 A1 | 2/2009 | | |
| WO | WO 2009/080938 A2 | 7/2009 | | |
| WO | WO 2010/029266 A1 | 3/2010 | | |
| WO | WO 2012/172262 A1 | 12/2012 | | |
| WO | WO-2012172252 A1 * | 12/2012 | | C03C 25/321 |

* cited by examiner

SIZING COMPOSITION FOR MINERAL WOOL, COMPRISING LIGNOSULFONATE AND A CARBONYL COMPOUND, AND RESULTING INSULATING PRODUCTS

CROSS-REFERENCE TO RELATED APPLICATIONS

This application is the U.S. National Stage of PCT/FR2016/050205, filed Feb. 1, 2016, which in turn claims priority to French patent application number 1550721 filed Jan. 30, 2015 and French patent application number 1550723 filed Jan. 30, 2015. The content of these applications are incorporated herein by reference in their entireties.

The present invention relates to the field of thermal and/or acoustic insulating products based on mineral wool, in particular glass or rock wool, and on a formaldehyde-free organic binder.

The invention more particularly relates to a sizing composition capable of crosslinking in order to form said organic binder which includes at least one lignosulfonate and at least one carbonyl compound, and also to the insulating products which result therefrom.

The manufacture of insulating products based on mineral wool generally comprises a stage of manufacture of the wool itself, which can be carried out by various processes, for example according to the known technique of fiberizing by internal or external centrifugation. In particular, internal centrifugation consists in introducing the molten mineral material (glass or rock) into a centrifugal device comprising a multitude of small orifices, the material being projected toward the peripheral wall of the device under the action of the centrifugal force and escaping therefrom in the form of filaments. On leaving the centrifugal device, the filaments are drawn and carried toward a receiving member by a gas stream having a high temperature and a high speed, in order to form therein a web of fibers (or mineral wool).

In order to provide for the assembly of the fibers together and to make it possible for the web to have cohesion, a sizing composition comprising a thermosetting resin is projected onto the fibers, on the route between the outlet of the centrifugal device and the receiving member. The web of fibers which are coated with the size is subjected to a heat treatment, at a temperature generally of greater than 100° C., in order to bring about the polycondensation of the resin and to thus obtain a thermal and/or acoustic insulating product having specific properties, in particular dimensional stability, tensile strength, thickness recovery after compression and homogeneous color.

The sizing composition to be projected onto the mineral wool is generally provided in the form of an aqueous solution including the thermosetting resin and additives, such as a catalyst for the crosslinking of the resin, an adhesion-promoting silane, a dust-preventing mineral oil, and the like. The sizing composition is generally applied to the fibers by spraying.

The properties of the sizing composition depend largely on the characteristics of the resin. From the viewpoint of the application, it is necessary for the sizing composition to exhibit good sprayability and to be able to be deposited at the surface of the fibers in order to efficiently bind them.

The resin has to be stable for a given period of time before being used to form the sizing composition, which composition is generally prepared at the time of use by mixing the resin and the additives mentioned above.

At the regulatory level, it is necessary for the resin to be regarded as nonpolluting, that is to say for it to comprise— and for it to generate during the sizing stage or subsequently—as little as possible in the way of compounds which may be harmful to human health or to the environment.

The thermosetting resins most commonly used are phenolic resins belonging to the family of the resols. In addition to their good crosslinkability under the abovementioned thermal conditions, these resins are soluble in water, have a good affinity for mineral fibers, in particular glass fibers, and are relatively inexpensive.

Resols are generally obtained by reaction of a phenol and of an aldehyde under basic conditions, a certain proportion of these compounds of which which have not reacted occurs in the final resin. The most widely used aldehyde is formaldehyde, the presence of which in the form of free aldehyde is undesirable because of its known harmful effects.

Regulations with regard to environmental protection, which are becoming more restrictive, are forcing manufacturers of insulating products to look for solutions which make it possible to further lower the levels of undesirable emissions, in particular of formaldehyde, whether in the manufacture of the insulating products or in their use.

Solutions in which resols are replaced in sizing compositions are known and are based on the use of a polymer of carboxylic acid and of a hydroxylated compound.

In U.S. Pat. No. 5,340,868, the size comprises a polycarboxylic polymer, a β-hydroxyamide and an at least trifunctional monomeric carboxylic acid.

Sizing compositions which comprise a polycarboxylic polymer, a polyol and a catalyst, which catalyst is a catalyst containing phosphorus (U.S. Pat. Nos. 5,318,990, 5,661,213, 6,331,350, US 2003/0008978), a fluoroborate (U.S. Pat. No. 5,977,232) or else a cyanamide, a dicyanamide or a cyanoguanidine (U.S. Pat. No. 5,932,689), are also known.

Sizing compositions comprising an alkanolamine including at least two hydroxyl groups and a polycarboxylic polymer (U.S. Pat. Nos. 6,071,994, 6,099,773, 6,146,746, US 2002/0091185) in combination with a copolymer (U.S. Pat. No. 6,299,936) are also known.

Provision has also been made to replace all or part of the hydroxylated compound with a saccharide.

A description is given, in US 2005/0215153, of a size formed from a prebinder containing polymer of carboxylic acid and of a polyol, and from a dextrin as cobinder.

Furthermore, adhesive compositions based on saccharides which can be used as sizes for mineral wool are known. In U.S. Pat. No. 5,895,804, the composition comprises a polycarboxylic polymer having at least two carboxylic acid functional groups and a molecular weight at least equal to 1000, and a polysaccharide having a molecular weight at least equal to 10,000. In WO 2009/080938, the sizing composition comprises a monosaccharide and/or a polysaccharide and an organic polycarboxylic acid with a molar mass of less than 1000, optionally in combination with a catalyst making it possible to adjust the crosslinking start temperature.

An aqueous formaldehyde-free sizing composition which comprises a Maillard reaction product, in particular combining a reducing sugar, a carboxylic acid and aqueous ammonia, is also known (WO 2007/014236). Provision is made, in WO 2009/019232 and WO 2009/019235, to replace the carboxylic acid with an acid precursor derived from an inorganic salt, in particular an ammonium salt, which exhibits the additional advantage of being able to replace all or part of the aqueous ammonia.

Finally, WO 2012/172262 discloses a sizing composition for mineral wool which comprises a lignosulfonic acid salt, an oligosaccharide and a crosslinking catalyst.

It is an aim of the present invention to provide an alternative to the sizing compositions for insulating products based on mineral wool which does not contain formaldehyde and which exhibits improved physicochemical properties with respect to those described in WO 2012/172262.

This aim is achieved according to the invention by the sizing composition for insulating products based on mineral wool, in particular glass or rock wool, which comprises:
- at least one ammonium lignosulfonate or one alkali metal or alkaline earth metal salt of lignosulfonic acid, and
- at least one carbonyl compound of formula:

$$R\text{—}[C(O)R_1]_x \qquad (I)$$

in which:
- R represents a saturated or unsaturated and linear, branched or cyclic hydrocarbon radical, a radical including one or more aromatic nuclei which consist of 5 or 6 carbon atoms, a radical including one or more aromatic heterocycles containing 4 or 5 carbon atoms and an oxygen, nitrogen or sulfur atom, it being possible for the R radical to contain other functional groups, in particular hydroxyl or alkoxy groups, especially methoxy groups,
- $R_1$ represents a hydrogen atom or a $C_1$-$C_{10}$ alkyl radical, and
- x varies 1 to 10.

Preferably, the sizing composition is devoid of hydrogenated sugar and of melamine.

Ammonium lignosulfonate is a byproduct resulting from the treatment of wood for the manufacture of paper pulp according to the "sulfite" process. The treatment of the paper pulp with ammonium sulfite or ammonium bisulfite makes it possible to obtain ammonium lignosulfonates.

In addition, ammonium lignosulfonate makes it possible to confer, on the binder, a good resistance to fire.

The alkali metal or alkaline earth metal salts of lignosulfonic acid are generally complex mixtures of several lignosulfonic acids in the salified form, commonly denoted "lignosulfonates". Lignosulfonates are byproducts resulting from the treatment of wood for the manufacture of paper pulp according to the abovementioned "sulfite" process which employs a sulfite or a bisulfite. According to the nature of the counterion of the sulfite or bisulfite employed, alkali metal or alkaline earth metal salts of lignosulfonic acid are obtained in particular. In the present invention, the preferred alkali metal salts of lignosulfonic acid are sodium or potassium, advantageously sodium, lignosulfonates, and the preferred alkaline earth metal salts of lignosulfonic acid are magnesium or calcium lignosulfonates.

The preferred carbonyl compound is an aldehyde corresponding to the formula (I) in which the $R_1$ radical represents a hydrogen atom and x is at most equal to 6.

The carbonyl functional group of the aldehyde can, in this case, exist in the form of an acetal or of a hemiacetal of following formula (II):

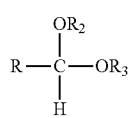

(II)

in which:
- $R_2$ represents a $C_1$-$C_{10}$ alkyl radical, and
- $R_3$ represents a hydrogen atom or a $C_1$-$C_{10}$ alkyl radical.

More preferably still, the carbonyl compound of formula (I) is a monofunctional or polyfunctional aldehyde chosen from the group consisting of acetaldehyde, propionaldehyde, dimethoxyethanal, butyraldehyde, in particular n-butyraldehyde, glyoxal, malonaldehyde, succinaldehyde, glutaraldehyde, 2-hydroxyglutaraldehyde, 3-methylglutaraldehyde, adipaldehyde, suberaldehyde, sebacaldehyde, malealdehyde, fumaraldehyde, poly(acroleins), dialdehyde starch, furfural (2-furancarboxyaldehyde), 5-methylfurfural (2-methyl-5-furancarboxyaldehyde), hydroxymethylfurfural (2-hydroxymethyl-5-furancarboxyaldehyde), 2,5-furancarboxydialdehyde, vanillin and vanillin polymers, in particular bis-vanillin, cinnamaldehyde and cinnamaldehyde polymers, phthalaldehyde, isophthalaldehyde, terephthalaldehyde and the oligomers of following formulae (III) and (IV):

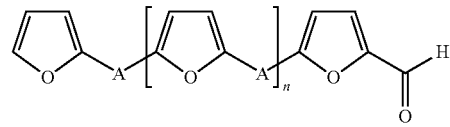

(III)

in which:
A represents a divalent —$CH_2$—, —CH(OH)— or —$CH_2$—O—$CH_2$— radical, n varies from 1 to 8,

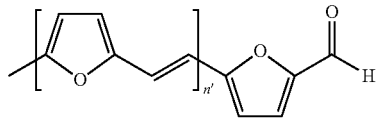

(IV)

in which n' varies from 1 to 9.

Hydroxymethylfurfural is particularly preferred.

In the sizing composition, ammonium lignosulfonate or the alkali metal or alkaline earth metal salt of lignosulfonic acid generally represents from 10 to 95% of the weight of the mixture consisting of ammonium lignosulfonate or the alkali metal or alkaline earth metal salt of lignosulfonic acid and the carbonyl compound of formula (I), preferably from 20 to 80%, advantageously from 30 to 70% and better still from 40 to 60%.

When the sizing composition contains an ammonium lignosulfonate, it can additionally comprise at least one compound chosen from phosphorus-containing compounds and ammonium sulfate.

Mention may be made, by way of examples, of alkali metal hypophosphite salts, alkali metal phosphites, alkali metal polyphosphates, alkali metal hydrogenphosphates, phosphoric acids and alkylphosphonic acids, in which the alkali metal is preferably sodium or potassium; ammonium phosphates, in particular diammonium phosphate; and ammonium sulfate.

The phosphorus-containing compound and the ammonium sulfate can be added to the sizing composition in a proportion of at most 20 parts by weight per 100 parts by weight of ammonium lignosulfonate and of carbonyl compound of formula (I), preferably at most 15 parts and advantageously at most 10 parts.

The sizing composition in accordance with the invention can also comprise the conventional additives below in the following proportions, calculated on the basis of 100 parts by weight of ammonium lignosulfonate or of alkali metal or alkaline earth metal salt of lignosulfonic acid and of carbonyl compound of formula (I):
- 0 to 5 parts of silane, in particular an aminosilane,
- 0 to 20 parts of oil, preferably 4 to 15 parts,
- 0 to 30 parts of glycerol, preferably 0 to 20 parts,
- 0 to 5 parts of a silicone,
- 0 to 40 parts of an organic phosphate, preferably 0 to 30 parts,
- 0 to 20 parts of an extender, in particular carbohydrates, such as molasses or a dextrin, and animal or plant proteins, in particular soybean proteins.

When the sizing composition contains an ammonium lignosulfonate, the latter can additionally include urea and/or a compound including a high proportion of nitrogen, such as a melamine resin and dicyandiamide. The amount of urea represents up to 30 parts by weight per 100 parts by weight of ammonium lignosulfonate and of carbonyl compound of formula (I), and preferably up to 20 parts. The amount of compound including nitrogen represents up to 40 parts by weight per 100 parts by weight of ammonium lignosulfonate and of carbonyl compound of formula (I), and preferably up to 30 parts.

The role of the additives is known and briefly restated: the silane is an agent for coupling between the fibers and the binder, and also acts as antiaging agent; the oils are dust-preventing and hydrophobic agents; the urea and the glycerol act as plasticizers and make it possible to prevent the pregelling of the sizing composition; the silicone is a hydrophobic agent which has the role of reducing the absorption of water by the insulating product; the organic phosphate and the nitrogenous compound act as flame-retardant agent.

The sizing composition is intended to be applied to mineral fibers, in particular glass or rock fibers.

Conventionally, the sizing composition is projected onto the mineral fibers at the outlet of the centrifugal device and before they are collected on the receiving member in the form of a web of fibers which is subsequently treated at a temperature which makes possible the crosslinking of the size and the formation of an infusible binder. The crosslinking of the size according to the invention takes place at a temperature comparable to that of a conventional phenol-formaldehyde resin, at a temperature greater than or equal to 110° C., preferably greater than or equal to 130° C., advantageously greater than or equal to 140° C. and better still at most equal to 300° C.

The acoustic and/or thermal insulating products obtained from these sized fibers also constitute a subject matter of the present invention.

These products are generally provided in the form of a mat or of a felt of mineral wool, of glass or of rock, or of a veil of mineral fibers, also of glass or of rock, intended in particular to form a surface coating on said mat or on said felt.

The examples which follow make it possible to illustrate the invention without, however, limiting it.

In these examples, the following are measured on the sizing compositions:
- the pH, at a solids content equal to 30%,
- the viscosity, in mPa·s, at a solids content equal to 30%, by means of a rheometer of plane-plane rotational type at a shear rate of 100 s⁻, at 25° C. and 50° C.,
- the contact angle, on a CM210 glass plate, at a solids content equal to 30%,
- the crosslinking start temperature ($T_C$) and the crosslinking rate (R) by the Dynamic Mechnical Analysis (DMA) method, which make it possible to characterize the viscoelastic behaviour of a polymeric material. The procedure is as follows: a sample of Whatman paper is impregnated with the sizing composition (solids content of the order of 30%) and then it is fixed horizontally between two jaws. An oscillating component equipped with a device for measuring the stress as a function of the strain applied is positioned on the upper face of the sample. The device makes it possible to calculate the modulus of elasticity E. The sample is heated to a temperature varying from 20 to 250° C. at the rate of 4° C./min. The curve of variation in the modulus of elasticity E (in MPa) as a function of the temperature (in ° C.) is plotted from the measurements, the general appearance of the curve being given in FIG. 1. The values corresponding to the crosslinking start temperature ($T_C$), in ° C., and the slope corresponding to the rate of crosslinking (R), in MPa/° C., are determined on the curve,
- loss of weight by thermogravimetric analysis (TGA). The sizing composition is deposited in an aluminum dish and heated at 110° C. for 60 minutes and then at 190° C. for 10 minutes. 10 mg of the residue remaining in the dish are withdrawn and deposited in an alumina crucible. The crucible is placed in a device which continuously records the variation in weight as a function of the time for a temperature cycle ranging from 25° C. to 700° C. at the rate of 10°/min. The loss in weight at 200, 300 and 400° C. is determined on the curve recorded.

EXAMPLES 1 TO 9

Sizing compositions comprising the constituents appearing in table 1 (in parts by weight) are prepared. The reference sizing composition (denoted Ref.) is representative of the state of the art described in WO 2012/172262.

The sizing compositions are prepared by adding the lignosulfonate to a container containing water with stirring until completely dissolved and by then successively introducing the other compounds with vigourous stirring, until a stable emulsion is obtained.

The solids content of the sizing compositions is equal to 30%.

The results are given in table 1.

Examples 1 to 9 according to the invention exhibit a lower contact angle than the Reference, which is reflected by a better wetting of the glass fibers.

At an identical amount of ammonium lignosulfonate, example 2 exhibits a higher crosslinking start rate than the Reference.

Example 1, the amount of ammonium lignosulfonate of which is higher than the Reference, exhibits a lower crosslinking start temperature than the Reference and an identical crosslinking start rate.

Examples 5, 6, 8 and 9 exhibit a lower crosslinking start temperature than the Reference.

In addition, calcium lignosulfonate (examples 8 and 9) makes it possible to obtain a higher crosslinking start rate than the Reference.

TABLE 1

|  | Ex. 1 | Ex. 2 | Ex. 3 | Ex. 4 | Ex. 5 | Ex. 6 | Ex. 7 | Ex. 8 | Ex. 9 | Ref. |
|---|---|---|---|---|---|---|---|---|---|---|
| Sizing composition | | | | | | | | | | |
| Ammonium lignosulfonate[1] | 80 | 60 | — | — | — | — | — | — | — | 60 |
| Sodium lignosulfonate[2] | — | — | 95 | — | — | 80 | — | — | — | — |
| Magnesium lignosulfonate[3] | — | — | — | 95 | — | — | 80 | — | — | — |
| Calcium lignosulfonate[4] | 20 | 40 | — | — | 95 | — | — | 80 | 60 | — |
| Hydroxymethylfurfural | — | — | 5 | 5 | 5 | 20 | 20 | 20 | 40 | — |
| Glucose | — | — | — | — | — | — | — | — | — | 40 |
| Diammonium phosphate | — | — | — | — | — | — | — | — | — | 5 |
| Properties | | | | | | | | | | |
| pH | 4.9 | 4.7 | 7.8 | 3.4 | 4.8 | 7.1 | 3.2 | 4.7 | 4.8 | 6.4 |
| Viscosity (mPa · s) | | | | | | | | | | |
| at 25° C. | 3.8 | 3.6 | 5.4 | 3.1 | 3.9 | 2.9 | 2.2 | 2.9 | 4.1 | 3.8 |
| at 50° C. | 2.4 | 1.8 | 2.9 | 1.7 | 2.1 | 1.9 | 1.4 | 2.0 | 2.0 | 2.3 |
| Contact angle (°) | 16 | 9 | 19 | 19 | 18 | 18 | 13 | 16 | 11 | 24 |
| Crosslinking start temperature $T_c$ (° C.) | 106 | 108 | 158 | n.d. | 128 | 115 | n.d. | 108 | 113 | 140 |
| Crosslinking start rate R (MPa/° C.) | 8 | 18 | 7 | n.d. | 5.3 | 8.2 | n.d. | 11 | 19 | 8 |
| Loss of weight (%) | | | | | | | | | | |
| at 200° C. | 3 | 4 | 3 | 4 | 3 | 3 | 4 | 3 | 4 | 2 |
| at 300° C. | 19 | 15 | 16 | 16 | 20 | 15 | 13 | 17 | 15 | 16 |
| at 400° C. | 34 | 29 | 30 | 36 | 34 | 30 | 33 | 30 | 25 | 26 |

[1]T11N5, sold by Tembec
[2]Arbo N18, sold by Tembec
[3]Arbo MGLS, sold by Tembec
[4]C12, sold by Tembec

The invention claimed is:

1. A sizing composition for insulating products based on mineral wool, comprising:
   at least one ammonium lignosulfonate or one alkali metal or alkaline earth metal salt of lignosulfonic acid, and
   at least one carbonyl compound
   selected from the group consisting of, malonaldehyde, succinaldehyde, glutaraldehyde, 2-hydroxyglutaraldehyde, 3-methylglutaraldehyde, adipaldehyde, suberaldehyde, sebacaldehyde, poly(acroleins), hydroxymethylfurfural (2-hydroxymethyl-5-furancarboxyaldehyde), 2,5-furancarboxydialdehyde, vanillin polymers, cinnamaldehyde polymers, phthalaldehyde, isophthalaldehyde, and terephthalaldehyde,
   wherein the sizing composition is formaldehyde-free.

2. The composition as claimed in claim 1, wherein the composition is devoid of hydrogenated sugar and of melamine.

3. The composition as claimed in claim 1, wherein the ammonium lignosulfonate or the alkali metal or alkaline earth metal salt of lignosulfonic acid represents from 10 to 95% of the weight of the mixture consisting of ammonium lignosulfonate or the alkali metal or alkaline earth metal salt of lignosulfonic acid and the carbonyl compound.

4. The composition as claimed in claim 1, wherein the composition contains an ammonium lignosulfonate and at least one compound chosen from phosphorus-containing compounds and ammonium sulfate.

5. The composition as claimed in claim 4, wherein the phosphorus-containing compound and the ammonium sulfate are present in an amount at most equal to 20 parts by weight per 100 parts by weight of ammonium lignosulfonate and of carbonyl compound.

6. The composition as claimed in claim 1, further comprising the additives below in the following proportions, calculated on the basis of 100 parts by weight of ammonium lignosulfonate or of alkali metal or alkaline earth metal salt of lignosulfonic acid and of carbonyl compound:

0 to 5 parts of silane,
   0 to 20 parts of oil,
   0 to 30 parts of glycerol,
   0 to 5 parts of a silicone,
   0 to 40 parts of an organic phosphate,
   0 to 20 parts of an extender selected from carbohydrates, and animal or plant proteins.

7. The composition as claimed in claim 1, wherein the composition contains an ammonium lignosulfonate and urea.

8. The composition as claimed in claim 7, wherein the amount of urea represents up to 30 parts by weight per 100 parts by weight of ammonium lignosulfonate and of carbonyl compound.

9. An acoustic and/or thermal insulating product based on mineral wool, sized using a sizing composition for insulating products based on mineral wool comprising:
   at least one ammonium lignosulfonate or one alkali metal or alkaline earth metal salt of lignosulfonic acid, and
   at least one carbonyl compound
   selected from the group consisting of, malonaldehyde, succinaldehyde, glutaraldehyde, 2-hydroxyglutaraldehyde, 3-methylglutaraldehyde, adipaldehyde, suberaldehyde, sebacaldehyde, poly(acroleins), hydroxymethylfurfural (2-hydroxymethyl-5-furancarboxyaldehyde), 2,5-furancarboxydialdehyde, vanillin polymers, cinnamaldehyde polymers, phthalaldehyde, isophthalaldehyde, and terephthalaldehyde,
   wherein the sizing composition is formaldehyde-free.

10. The acoustic and/or thermal insulating product based on mineral wool as claimed in claim 9, wherein the mineral wool is glass or rock wool.

11. The acoustic and/or thermal insulating product based on mineral wool as claimed in claim 9, wherein the composition is devoid of hydrogenated sugar and of melamine.

12. The acoustic and/or thermal insulating product based on mineral wool as claimed in claim 9, wherein the ammonium lignosulfonate or the alkali metal or alkaline earth metal salt of lignosulfonic acid represents from 10 to 95% of the weight of the mixture consisting of ammonium lignosulfonate or the alkali metal or alkaline earth metal salt of lignosulfonic acid and the carbonyl compound.

* * * * *